(12) United States Patent
Kuniba

(10) Patent No.: US 6,876,770 B2
(45) Date of Patent: Apr. 5, 2005

(54) IMAGE ENCODING DEVICE, ELECTRONIC CAMERA AND RECORDING MEDIUM FOR IMAGE ENCODING PROGRAM

(75) Inventor: Hideyasu Kuniba, Tokyo (JP)

(73) Assignee: Nikon Corporation, Tokyo (JP)

( * ) Notice: Subject to any disclaimer, the term of this patent is extended or adjusted under 35 U.S.C. 154(b) by 668 days.

(21) Appl. No.: 10/005,070

(22) Filed: Dec. 7, 2001

(65) Prior Publication Data

US 2002/0122489 A1 Sep. 5, 2002

(30) Foreign Application Priority Data

Dec. 8, 2000 (JP) ........................................ 2000-374217

(51) Int. Cl.⁷ .............................................. G06K 9/36
(52) U.S. Cl. ..................................................... 382/239
(58) Field of Search ................................ 382/232, 233, 382/236, 238, 239, 240, 248, 251, 252; 375/240.03, 240.05, 240.11, 240.16, 240.18, 240.19, 240.25; 348/389.1, 394.1, 395.1, 403.1, 404.1, 408.1, 424.2

(56) References Cited

U.S. PATENT DOCUMENTS 5,333,012 A * 7/1994 Singhal et al. ......... 375/240.04
5,802,213 A * 9/1998 Gardos ....................... 382/239
5,835,149 A * 11/1998 Astle ...................... 375/240.05
5,995,668 A * 11/1999 Corset et al. ............... 382/233
6,128,344 A * 10/2000 Aono et al. ............. 375/240.11
6,351,491 B1 * 2/2002 Lee et al. ............... 375/240.03
6,707,948 B1 * 3/2004 Cosman et al. ............. 382/240

FOREIGN PATENT DOCUMENTS

JP 2000-358183 12/2000
JP 2001-230947 8/2001

* cited by examiner

Primary Examiner—Jose L. Couso
(74) Attorney, Agent, or Firm—Morgan, Lewis & Bockius LLP

(57) ABSTRACT

The object of the present invention is to provide an image encoding device for designating a selected region constituting a region to which a greater quantity of information is allocated in an image. Thus, the present invention provides an image encoding device including a transformation component for converting an image into transformation coefficients by subjecting the image to a frequency decomposition. The image encoding device further includes a dividing component for dividing the transformation coefficients produced by the transformation component into a "selected region on the image" and a "non-selected region other than the selected region," and an encoding component for encoding the transformation coefficients by allocating a greater quantity of information to the selected region than to the non-selected region. The image encoding device yet further includes a region adjustment component for controlling a bit allocation rate of the non-selected region by adjusting the area of the selected region.

34 Claims, 7 Drawing Sheets

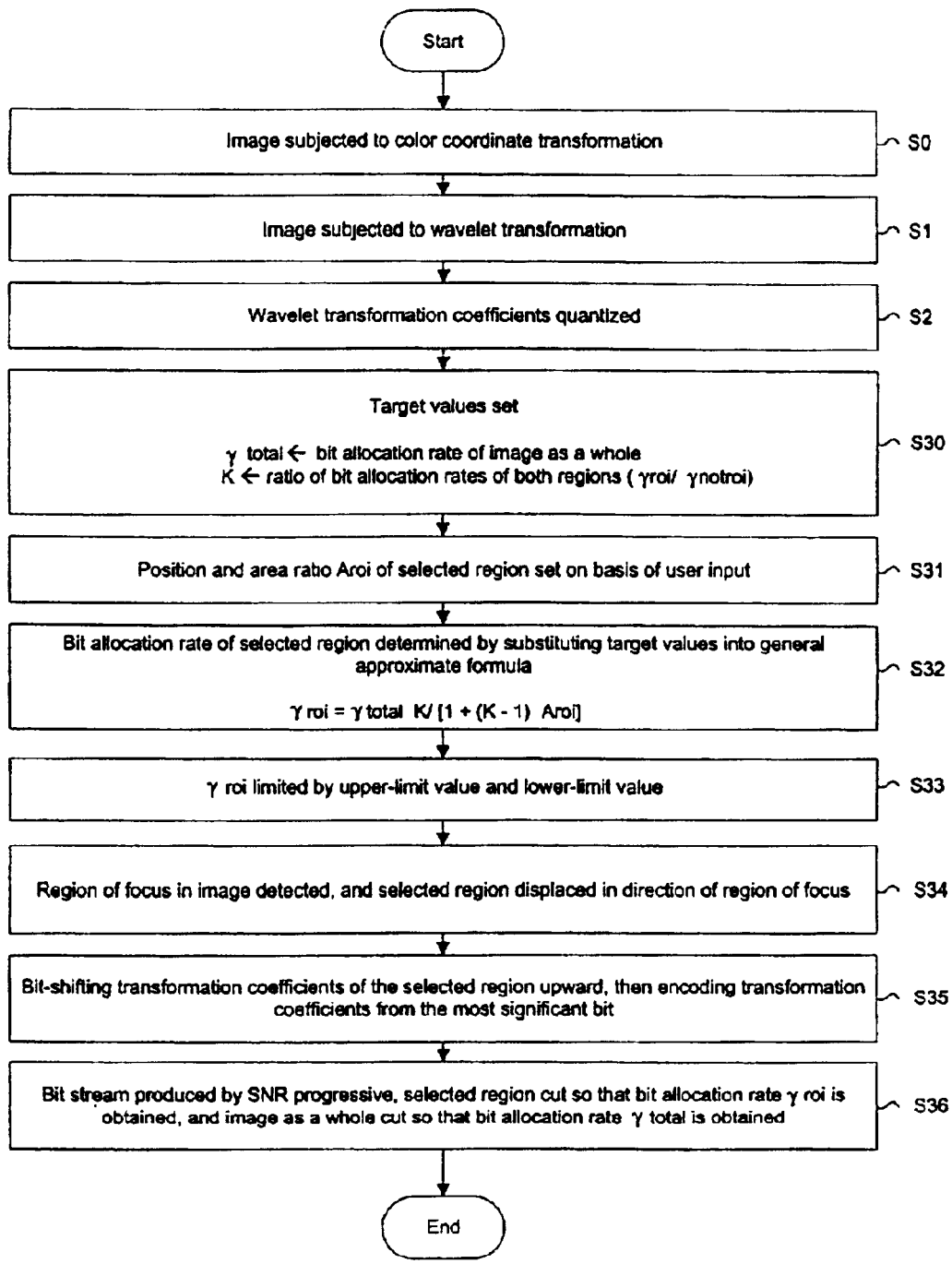

FIG. 6 (A-D)
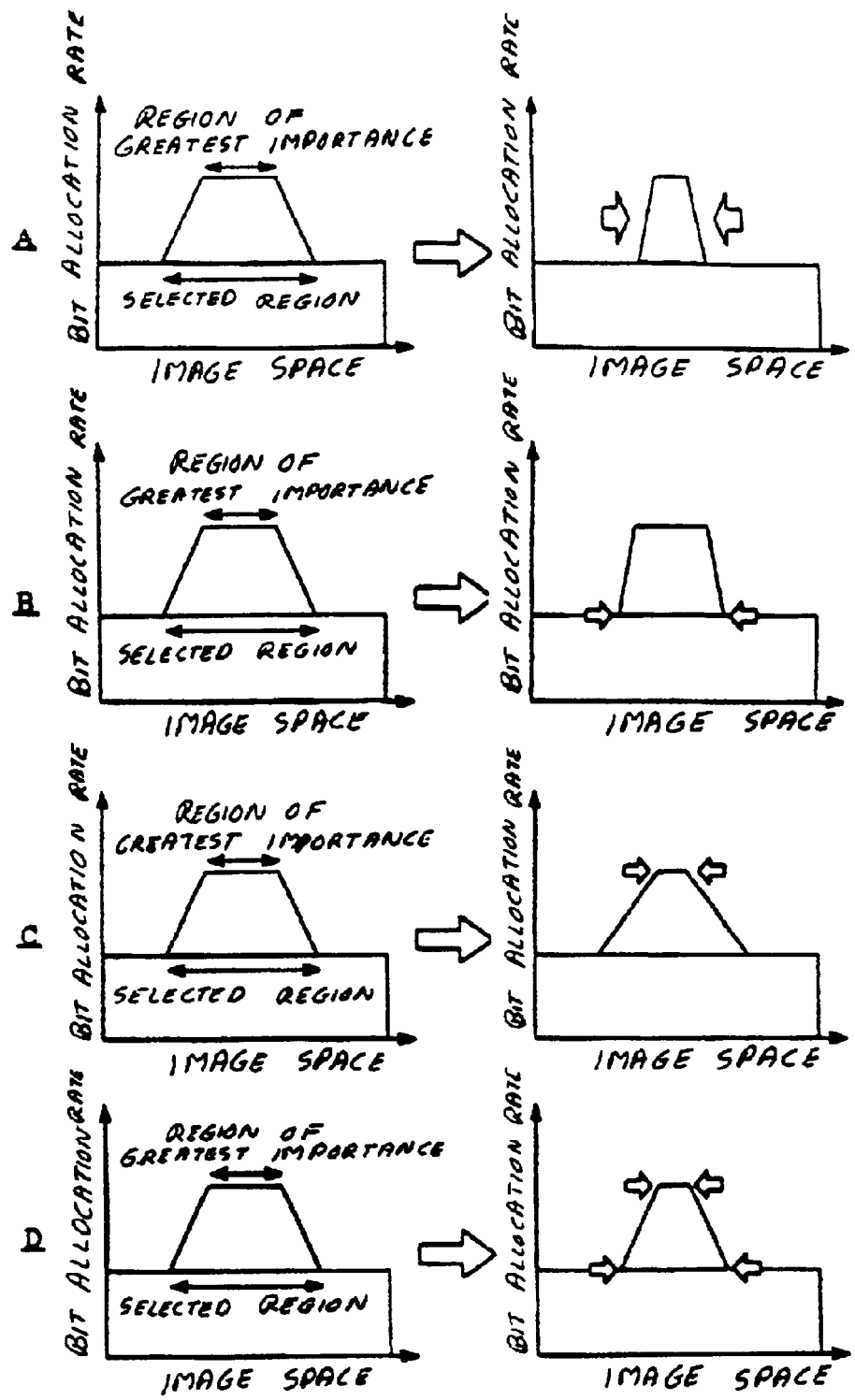

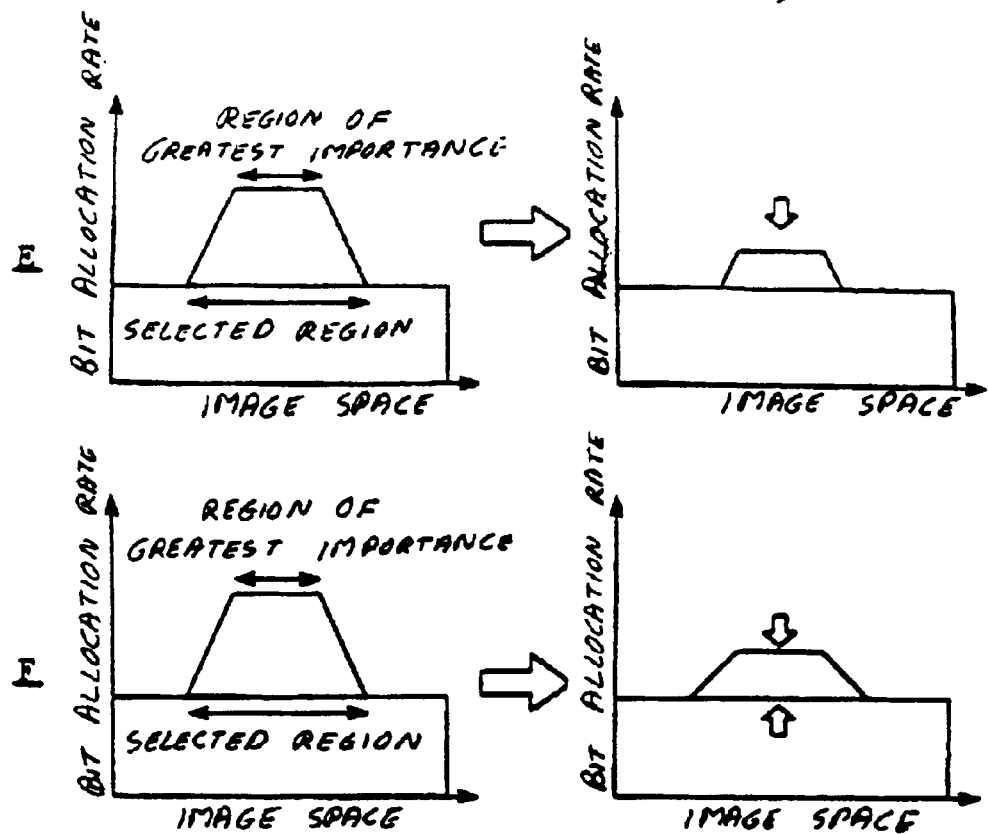

IMAGE ENCODING DEVICE, ELECTRONIC CAMERA AND RECORDING MEDIUM FOR IMAGE ENCODING PROGRAM

This application claims the benefits of priority under 35 U.S.C. § 119(a) of Japanese Application No. 2000-374217, filed Dec. 8, 2000, which is hereby incorporated by reference.

BACKGROUND OF INVENTION a. Field of Invention

The present invention relates generally to an image encoding device which compresses and encodes images. The invention also relates generally to an electronic camera which is equipped with the image encoding device. The invention further relates generally to an image encoding program which is used to realize the image encoding device in a computer, and a recording medium for the image encoding program.

b. Description of Related Art

In December of 1999, a committee draft (CD) of the JPEG2000 encoding algorithm was prepared, and the main technical content forming the core of this draft was finalized.

The processing steps of the JPEG2000 encoding algorithm will be outlined below.

(1) Color Coordinate Transformation

The input image is subjected to a color coordinate transformation as required.

(2) Wavelet Transformation

The image is subjected to discrete wavelet transformation in the vertical and horizontal directions, and is divided into a plurality of sub-bands (LL, LH, HL, HH). Among these sub-bands, the LL band of the lowest frequency region is repeatedly subjected to debunching wavelet transformation in a recursive manner.

(3) Quantization

The wavelet transformation coefficients are quantized by each sub-band. Moreover, in lossy/lossless unified processing, the quantization step is set at "1." Furthermore, in the case of lossy compression, the less significant N bit planes are discarded in a post-process. This discarding process is equivalent to the quantization step of the $N^{th}$ power of 2.

(4) Bit Modeling

Following quantization, the wavelet transformation coefficients are divided into encoding blocks of a fixed size (e.g., 64×64) within each sub-band. Next, the transformation coefficients within each encoding block are divided into sign bits and absolute values, and the absolute values are expressed in binary representation to construct bit planes. The bit planes are then encoded in order from the upper bit plane via the following three types of encoding passes; significance pass, refinement pass and cleanup pass. Furthermore, immediately after the uppermost bits of the corresponding absolute values have appeared on the bit plane, the sign bits are encoded.

(5) ROI (Region of Interest) Encoding

In this function, in order to improve the decoded image quality of a selected region, a greater quantity of information is allocated to a selected region on the image. Specifically, the transformation coefficients (following quantization) that are positioned in the selected region are shifted upward by S bits, and are then subjected to the bit modeling, discussed above. As a result, the selected region is shifted to the upper bit planes and is encoded with a higher priority than any bit of the non-selected region.

Moreover, in the max shift method, the bit shift number S is set so that it is larger than the place number of the uppermost bit in the non-selected region. Accordingly, the non-zero transformation coefficients of the selected region always have a value of the $S^{th}$ power of 2 or greater. Consequently, during decoding, the transformation coefficients of the selected region can easily be reproduced by selectively shifting quantized values of the $S^{th}$ power of 2.

(6) Arithmetical Encoding (7) Bit Stream Formation

Signal-to-Noise Ratio (SNR) progressive and space resolution progressive, are realized by arranging the data of the respective encoding blocks according to combinations of four axes; importance of bit plane, space resolution, block position and color components.

For example, in the case of SNR progressive, the respective encoding blocks are split for each encoding pass, and the split data is classified according to the degree of contribution to the improvement of SNR, so that a plurality of layers are constructed. An SNR progressive bit stream is formed by lining these layers in a top-down order. Additionally, fixed-length compression can be realized by cutting this bit stream using an appropriate file size.

Thus, a JPEG2000 compressed image file is produced by such an encoding procedure.

It should be noted that the most recent and complete developments on JPEG2000 are available in the final committee draft published by the JPEG Committee on the internet at http://www.jpeg.org/fed15444-1.zip. Additionally, following the approval of international standards planned for March 2001, more detailed and accurate international standards can be ascertained via ISO, ITU-T and other standards organizations.

As discussed above, in the case of JPEG2000, the processing content of ROI encoding is regulated. The designation of the selected region, however, is not particularly regulated, but is left up to a user's discretion. Accordingly, in the specific realization of ROI encoding, there is a need for the establishment of more appropriate selected region designation.

In particular, in the case of electronic cameras, fixed-length compression in which the amount of compressed code is more or less fixed is ordinarily performed. In the case of such fixed-length compression, the quantity of information for the non-selected region is reduced by allocating a greater quantity of information to the selected region. This leads to problems such as a noticeable drop in the image quality of the non-selected region as a result of unplanned region designation.

Accordingly, one object of the present invention is to perform appropriate region designation of the selected region.

Furthermore, another object of the present invention is to achieve an appropriate balance in image quality between the selected region and non-selected region in fixed-length compression.

SUMMARY OF INVENTION

In order to solve the above-mentioned problems, the present invention provides an image encoding device, including a transformation component for converting an image into transformation coefficients by subjecting the image to a frequency decomposition, the image having an area. The image encoding device further includes a dividing component for dividing the transformation coefficients produced by the transformation component into a selected region and a non-selected region on the image, the non-selected region being an area of the image other than an area defined by the selected region, an encoding component for encoding the transformation coefficients by allocating a greater quantity of information to the selected region than to the non-selected region, and a region adjustment component for controlling a bit allocation rate of the non-selected region by adjusting the area of the selected region, the bit allocation rate being a mean amount of code per unit area.

The region adjustment component further adjusts the area of the selected region by taking into account a bit allocation rate of the image as a whole, a bit allocation rate of the selected region, and the bit allocation rate of the non-selected region. Each of the bit allocation rates is determined in advance as a target value.

Alternatively, the region adjustment component adjusts the area of the selected region by taking into account a bit allocation rate of the image as a whole, a bit allocation rate of the selected region, and a ratio of the bit allocation rate of the selected region to the bit allocation rate of the non-selected region. Each of the bit allocation rates and the ratio are determined in advance as target values.

Furthermore, the region adjustment component determines an adjustment value of the area of the selected region by substituting the target values into the following general calculation equation:

$$\gamma\ total = \gamma\ roi \times Aroi + \gamma\ notroi \times (1 - Aroi),$$

where, $\gamma$ total is the bit allocation rate of the image as a whole, $\gamma$ roi is the bit allocation rate of the selected region, Aroi is a proportion of the area of the image as a whole that is occupied by the selected region, and $\gamma$ notroi is the bit allocation rate of the non-selected region, and solving the equation.

Moreover, the region adjustment component limits the adjustment value of the area of the selected region by at least a predetermined upper-limit value or a pre-determined lower-limit value.

The present invention further provides an image encoding device including a transformation component for converting an image into transformation coefficients by subjecting the image to a frequency decomposition, the image having an area. The image encoding device further includes a dividing component for dividing the transformation coefficients produced by the transformation component into a selected region and a non-selected region on the image, the non-selected region being an area of the image other than an area defined by the selected region, an encoding component for encoding the transformation coefficients by allocating a greater quantity of information to the selected region than to the non-selected region, and a region adjustment component for controlling a bit allocation rate of the non-selected region by adjusting a bit allocation rate of the selected region.

The region adjustment component adjusts the bit allocation rate of the selected region by taking into account a bit allocation rate of the image as a whole, the area of the selected region, and the bit allocation rate of the non-selected region. Each of the bit allocation rates and the area are determined in advance as target values.

Alternatively, the region adjustment component adjusts the bit allocation rate of the selected region by taking into account a bit allocation rate of the image as a whole, the area of the selected region, and a ratio of the bit allocation rate of the selected region to the bit allocation rate of the non-selected region. The bit allocation rate of the image as a whole, the area of the selected region and the ratio are determined in advance as target values.

Furthermore, the region adjustment component determines an adjustment value of the bit allocation rate of the selected region by substituting the target values into the following general calculation equation:

$$\gamma\ total = \gamma\ roi \times Aroi + \gamma\ notroi \times (1 - Aroi),$$

where, $\gamma$ total is the bit allocation rate of the image as a whole, $\gamma$ roi is the bit allocation rate of the selected region, Aroi is a proportion of the area of the image as a whole that is occupied by the selected region, and $\gamma$ notroi is the bit allocation rate of the non-selected region, and solving the equation.

Moreover, the region adjustment component limits the adjustment value of the bit allocation rate of the selected region by at least a pre-determined upper-limit value or a pre-determined lower-limit value.

The present invention yet further provides an image encoding device, including a transformation component for converting an image into transformation coefficients by subjecting the image to a frequency decomposition. The image encoding device further includes a dividing component for dividing the transformation coefficients produced by the transformation component into a selected region and a non-selected region on the image, the non-selected region being an area of the image other than an area defined by the selected region, an encoding component for encoding the transformation coefficients by allocating a greater quantity of information to the selected region than to the non-selected region, wherein the encoding component encodes the transformation coefficients while gradually increasing allocation of a quantity of information from a peripheral part of the selected region toward a central part of the selected region, and a region adjustment component for controlling a bit allocation rate of the non-selected region by adjusting a slope of increase of the allocation.

The present invention yet further provides an image encoding device, including a transformation component for converting an image into transformation coefficients by subjecting the image to a frequency decomposition. The image encoding device further includes a dividing component for dividing the transformation coefficients produced by the transformation component into a selected region and a non-selected region on the image, the non-selected region being an area of the image other than an area defined by the selected region, an encoding component for encoding the transformation coefficients by allocating a greater quantity of information to the selected region than to the non-selected region, wherein the encoding component encodes the transformation coefficients while gradually increasing allocation of a quantity of information from a peripheral part of the selected region toward a central part of the selected region, and a region adjustment component for controlling a bit allocation rate of the non-selected region by adjusting a maximum value of a bit allocation rate of the selected region.

The present invention yet further provides an image encoding device, including a transformation component for converting an image into transformation coefficients by subjecting the image to a frequency decomposition. The image encoding device further includes a region adjustment component for detecting a region of focus on the image and for determining a selected region on the image on the basis of the region of focus, a dividing component for dividing the transformation coefficients produced by the transformation component into the selected region and a non-selected region on the image, the non-selected region being an area of the image other than an area defined by the selected region, and an encoding component for encoding the transformation coefficients by allocating a greater quantity of information to the selected region than to the non-selected region.

The present invention yet further provides an image encoding device, including a transformation component for converting an image into transformation coefficients by subjecting the image to a frequency decomposition. The image encoding device further includes a dividing component for dividing the transformation coefficients produced by the transformation component into a selected region and a non-selected region on the image, the non-selected region being an area of the image other than an area defined by the selected region, an encoding component for encoding the transformation coefficients by allocating a greater quantity of information to the selected region than to the non-selected region, and a region adjustment component for detecting a region of focus on the image and for displacing the selected region in direction of the region of focus.

The present invention yet farther provides an image encoding device, including a transformation component for converting an image into transformation coefficients by subjecting the image to a frequency decomposition. The image encoding device further includes a region adjustment component for receiving an input indicating a selected region on the image and for setting the selected region in accordance with the input, a dividing component for dividing the transformation coefficients produced by the transformation component into the selected region and a non-selected region on the image, the non-selected region being an area of the image other than an area defined by the selected region, and an encoding component for encoding the transformation coefficients by allocating a greater quantity of information to the selected region than to the non-selected region.

It should be noted that in each alternative embodiment of the image encoding device discussed above, the region adjustment component reduces noise generated in the non-selected region as a result of high-performance encoding by performing a space frequency low-pass treatment on the non-selected region.

The present invention yet further provides an electronic camera, including an image encoding device, including a transformation component for converting an image into transformation coefficients by subjecting the image to a frequency decomposition, the image having an area, a dividing component for dividing the transformation coefficients produced by the transformation component into a selected region and a non-selected region on the image, the non-selected region being an area of the image other than an area defined by the selected region, an encoding component for encoding the transformation coefficients by allocating a greater quantity of information to the selected region than to the non-selected region, and a region adjustment component for controlling a bit allocation rate of the non-selected region by adjusting the area of the selected region, the bit allocation rate being a mean amount of code per unit area. The electronic camera further includes an imaging component for imaging an object and producing image data, wherein the image encoding device encodes the image data produced by the imaging component.

The present invention yet further provides a computer, including an image encoding program which allows the computer to function as: a transformation component for converting an image into transformation coefficients by subjecting the image to a frequency decomposition, the image having an area, a dividing component for dividing the transformation coefficients produced by the transformation component into a selected region and a non-selected region on the image, the non-selected region being an area of the image other than an area defined by the selected region, an encoding component for encoding the transformation coefficients by allocating a greater quantity of information to the selected region than to the non-selected region, and a region adjustment component for controlling a bit allocation rate of the non-selected region by adjusting the area of the selected region, the bit allocation rate being a mean amount of code per unit area. The computer further includes a machine-readable recording medium for recording the image encoding program.

The present invention yet further provides a method of encoding an image, including the steps of converting an image into transformation coefficients by subjecting the image to a frequency decomposition, the image having an area, and dividing the transformation coefficients into a selected region and a non-selected region on the image, the non-selected region being an area of the image other than an area defined by the selected region. The method further includes the steps of encoding the transformation coefficients by allocating a greater quantity of information to the selected region than to the non-selected region, and controlling a bit allocation rate of the non-selected region by adjusting the area of the selected region, the bit allocation rate being a mean amount of code per unit area.

The method further includes the step of adjusting the area of the selected region by taking into account: a bit allocation rate of the image as a whole, a bit allocation rate of the selected region, and the bit allocation rate of the non-selected region, wherein, each of the bit allocation rates is determined in advance as a target value.

Alternatively, the method further includes the step of adjusting the area of the selected region by taking into account: a bit allocation rate of the image as a whole, a bit allocation rate of the selected region, and a ratio of the bit allocation rate of the selected region to the bit allocation rate of the non-selected region, wherein, each of the bit allocation rates and the ratio are determined in advance as target values.

Furthermore, the method further includes the steps of determining an adjustment value of the area of the selected region by substituting the target values into the following general calculation equation:

$$\gamma\ total = \gamma\ roi \times Aroi + \gamma\ notroi \times (1 \times A\ roi),$$

where, $\gamma$ total is the bit allocation rate of the image as a whole, $\gamma$ roi is the bit allocation rate of the selected region, Aroi is a proportion of the area of the image as a whole that is occupied by the selected region, and $\gamma$ notroi is the bit allocation rate of the non-selected region, and solving the equation.

The method yet further includes the step of limiting the adjustment value of the area of the selected region by at least a pre-determined upper-limit value or a pre-determined lower-limit value.

The present invention yet further provides a method of encoding an image, including the steps of converting an image into transformation coefficients by subjecting the image to a frequency decomposition, the image having an area, and dividing the transformation coefficients into a selected region and a non-selected region on the image, the non-selected region being an area of the image other than an area defined by the selected region. The method further includes the steps of encoding the transformation coefficients by allocating a greater quantity of information to the selected region than to the non-selected region, and controlling a bit allocation rate of the non-selected region by adjusting a bit allocation rate of the selected region.

The method further includes the step of adjusting the bit allocation rate of the selected region by taking into account a bit allocation rate of the image as a whole, the area of the selected region, and the bit allocation rate of the non-selected region, wherein, each of the bit allocation rates and the area are determined in advance as target values.

Alternatively, the method further includes the step of adjusting the bit allocation rate of the selected region by taking into account a bit allocation rate of the image as a whole, the area of the selected region, and a ratio of the bit allocation rate of the selected region to the bit allocation rate of the non-selected region, wherein, the bit allocation rate of the image as a whole, the area of the selected region and the ratio are determined in advance as target values.

Furthermore, the method further includes the step of determining an adjustment value of the bit allocation rate of the selected region by substituting the target values into the following general calculation equation:

$$\gamma\ total = \gamma\ roi \times Aroi + \gamma\ notroi \times (1 \times Aroi),$$

where, $\gamma$ total is the bit allocation rate of the image as a whole, $\gamma$ roi is the bit allocation rate of the selected region, Aroi is a proportion of the area of the image as a whole that is occupied by the selected region, and $\gamma$ notroi is the bit allocation rate of the non-selected region, and solving the equation.

Moreover, the method further includes the step of limiting the adjustment value of the bit allocation rate of the selected region by at least a pre-determined upper-limit value or a pre-determined lower-limit value.

The present invention yet further provides a method of encoding an image, including the steps of converting an image into transformation coefficients by subjecting the image to a frequency decomposition, and dividing the transformation coefficients into a selected region and a non-selected region on the image, the non-selected region being an area of the image other than an area defined by the selected region. The method further includes the steps of encoding the transformation coefficients by allocating a greater quantity of information to the selected region than to the non-selected region, wherein the transformation coefficients are encoded while allocation of a quantity of information from a peripheral part of the selected region toward a central part of the selected region is gradually increased, and controlling a bit allocation rate of the non-selected region by adjusting a slope of increase of the allocation.

The present invention yet further provides a method of encoding an image, including the steps of converting an image into transformation coefficients by subjecting the image to a frequency decomposition, and dividing the transformation coefficients into a selected region and a non-selected region on the image, the non-selected region being an area of the image other than an area defined by the selected region. The method further includes the steps of encoding the transformation coefficients by allocating a greater quantity of information to the selected region than to the non-selected region, wherein the transformation coefficients are encoded while allocation of a quantity of information from a peripheral part of the selected region toward a central part of the selected region is gradually increased, and controlling a bit allocation rate of the non-selected region by adjusting a maximum value of a bit allocation rate of the selected region.

The present invention yet further provides a method of encoding an image, including the steps of converting an image into transformation coefficients by subjecting the image to a frequency decomposition, and detecting a region of focus on the image. The method further includes the steps of determining a selected region on the image on the basis of the region of focus, dividing the transformation coefficients into the selected region and a non-selected region on the image, the non-selected region being an area of the image other than an area defined by the selected region, and encoding the transformation coefficients by allocating a greater quantity of information to the selected region than to the non-selected region.

The present invention yet further provides a method of encoding an image, including the steps of converting an image into transformation coefficients by subjecting the image to a frequency decomposition, and dividing the transformation coefficients into a selected region and a non-selected region on the image, the non-selected region being an area of the image other than an area defined by the selected region. The method further includes the steps of encoding the transformation coefficients by allocating a greater quantity of information to the selected region than to the non-selected region, detecting a region of focus on the image, and displacing the selected region in direction of the region of focus.

The present invention yet further provides a method of encoding an image, including the steps of converting an image into transformation coefficients by subjecting the image to a frequency decomposition, and receiving an input indicating a selected region on the image. The ethod further includes the steps of setting the selected region in accordance with the input, dividing the transformation coefficients into the selected region and a non-selected region on the image, the non-selected region being an area of the image other than an area defined by the selected region, and encoding the transformation coefficients by allocating a greater quantity of information to the selected region than to the non-selected region.

It should be noted that in each alternative method of encoding an image discussed above, the method further includes the step of reducing noise generated in the non-selected region as a result of high-performance encoding by performing a space frequency low-pass treatment on the non-selected region.

The present invention yet further provides a method of encoding an image in an electronic camera, including the steps of imaging an object, thus producing an image having an area, producing image data from the image, and encoding the image data by converting the image data into transformation coefficients by subjecting the image data to a frequency decomposition, and dividing the transformation coefficients into a selected region and a non-selected region of the image, the non-selected region being an area of the image other than an area defined by the selected region. The method of encoding further includes the steps of encoding the transformation coefficients by allocating a greater quantity of information to the selected region than to the non-selected region, and controlling a bit allocation rate of the non-selected region by adjusting the area of the selected region, the bit allocation rate being a mean amount of code per unit area.

The present invention yet further provides a method of encoding an image on a computer, including the step of recording an image encoding program on the computer, thus allowing the computer to: convert an image into transformation coefficients by subjecting the image to a frequency decomposition, the image having an area, divide the transformation coefficients into a selected region and a non-selected region on the image, the non-selected region being an area of the image other than an area defined by the selected region, encode the transformation coefficients by allocating a greater quantity of information to the selected region than to the non-selected region, and control a bit allocation rate of the non-selected region by adjusting the area of the selected region, the bit allocation rate being a mean amount of code per unit area.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings:

FIG. 5 is a flow chart which illustrates the operation of an image encoding device according to the present invention, in a third working configuration; and FIGS. 6A–6F are an explanatory diagram which illustrates adjustment of the selected region, in a fourth working configuration.

DETAILED DESCRIPTION OF THE PREFERRED EMBODIMENTS

Working configurations of the present invention will be described below with reference to the attached figures.

The first working configuration is a working configuration of an electronic camera.

Figure 1:
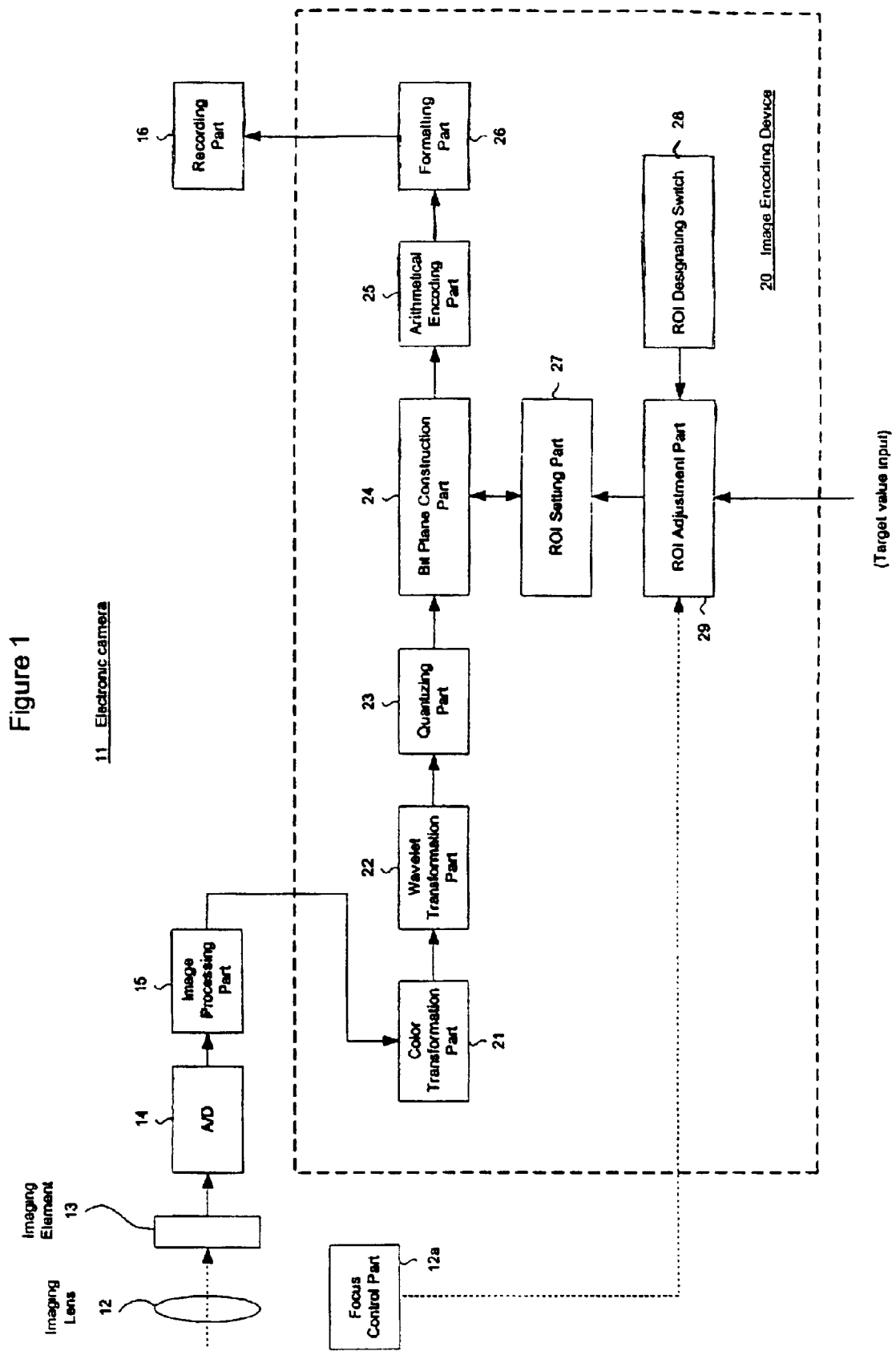
FIG. 1 is a block diagram which illustrates the construction of an electronic camera.

FIG. 1 is a block diagram which illustrates the construction of an electronic camera.

In FIG. 1, an imaging lens 12 is mounted on the electronic camera 11. The imaging plane of an imaging element 13 is disposed in the imaging space of imaging lens 12. The focus of imaging lens 12 is automatically controlled by a focus control part 12a, so that an image of the object of imaging is focused on the imaging plane of imaging element 13. Imaging element 13 subjects the image of the object of imaging to a photoelectric conversion, and outputs the result as an image signal. This image signal is digitized via an A/D converter part 14, and is then sent to an image processing part 15. Image processing part 15 performs image processing such as gradation conversion, black level correction and color interpolation processing on this image signal. Following this image processing, the image signal is sent to an image encoding device 20 inside electronic camera 11. Image encoding device 20 subjects the image signal to the compression and encoding stipulated by JPEG2000, and outputs a compressed image file. Recording part 16 acquires this image file and stores the image file on a recording medium such as a memory card.

The above-mentioned image encoding device 20 is constructed from the constituent elements discussed below.

(1) Color transformation part 21

(2) Wavelet transformation part 22

(3) Quantizing part 23

(4) Bit plane construction part 24

(5) Arithmetical encoding part 25

(6) Formatting part 26

(7) ROI setting part 27: A mask image indicating the selected region for ROI encoding is set. Bit plane construction part 24 divides the transformation coefficients into a selected region and non-selected region while referring to this mask image. Furthermore, bit plane construction part 24 allocates the quantity of information by shifting the transformation coefficients that have been divided into the selection region upward.

(8) ROI designating switch 28: This is a switch that allows the user to input the position and extent of the selected region. Specifically, this switch is constructed from a position input mechanism such as a cursor key or eye-control input device and a switch used to select the extent of the selected region.

(9) ROI adjustment part 29: This part determines the selected region in accordance with "the input values of ROI adjustment part 28" and the "target value input," and sets the mask image in ROI setting part 27. Furthermore, ROI adjustment part acquires position information concerning the region of focus from the focus control part 12a, and adjust the position of the selected region so that the region of focus is included in the selected region as far as possible.

Description of Operation of First Working Configuration

Figure 2:
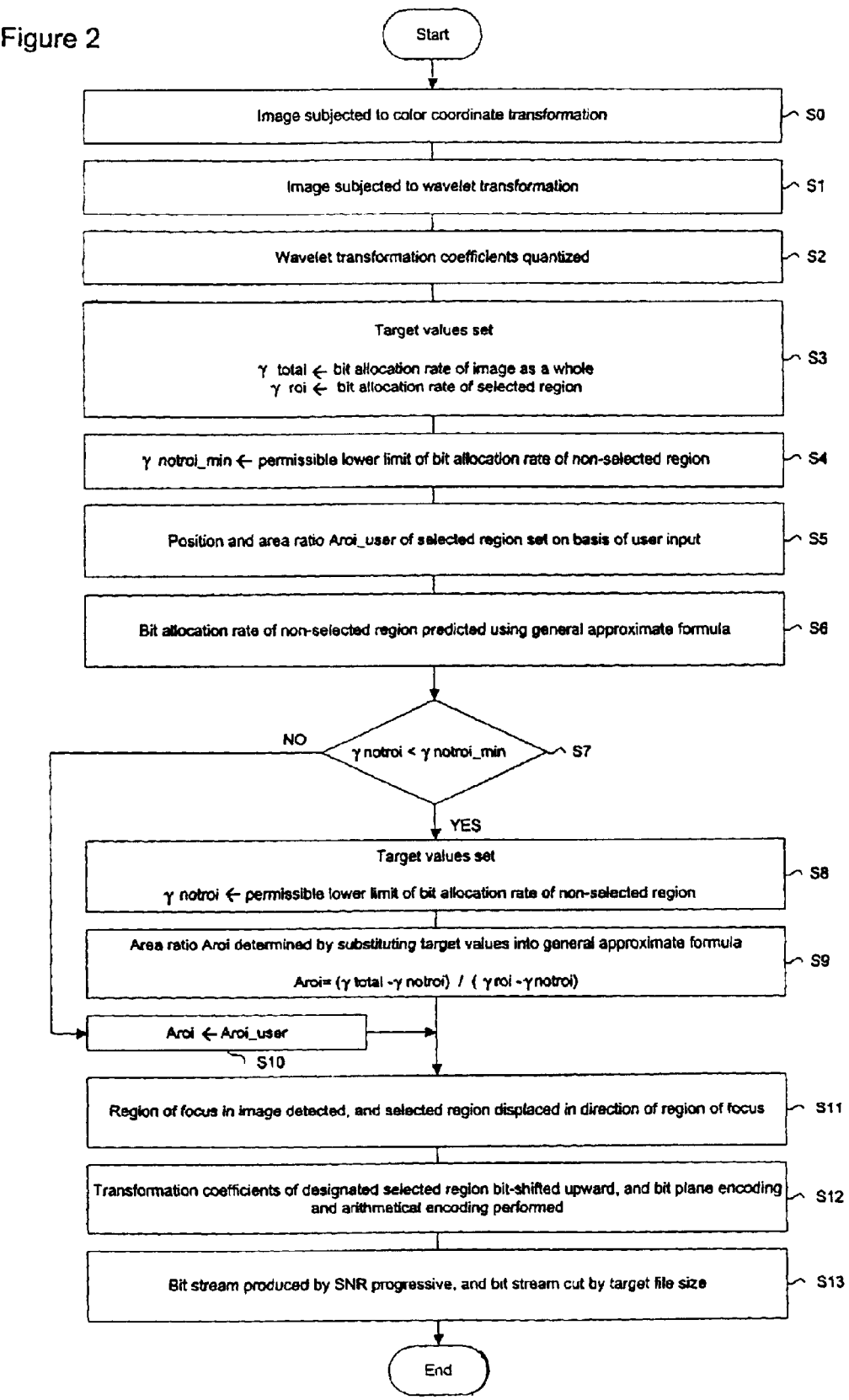
FIG. 2 is a flow chart which illustrates the operation of an image encoding device according to the present invention, in a first working configuration.
Figure 3:
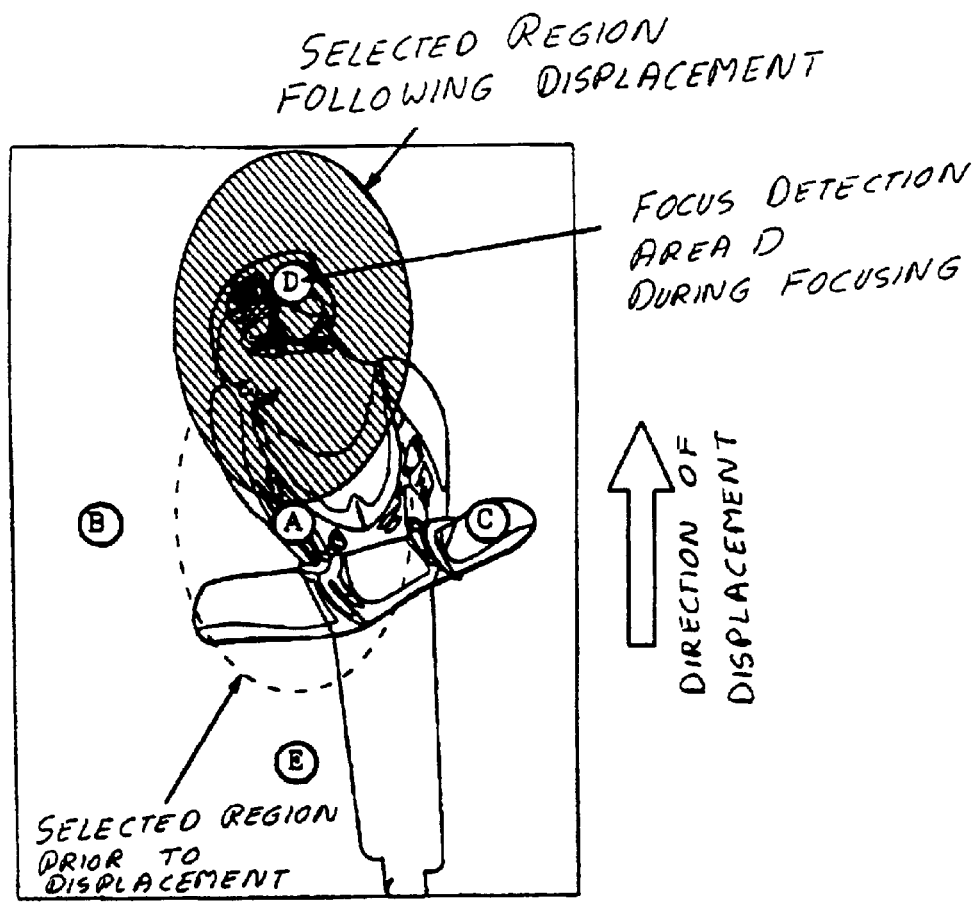
FIG. 3 is a diagram which illustrates the displacement of a selected region on the basis of the region of focus.

FIG. 2 is a flow chart which illustrates the operation of the image encoding device according to the present invention, in a first working configuration. FIG. 3 is a diagram which illustrates the displacement of a selected region on the basis of the region of focus. Below, the operation of the first working configuration will be described in specific terms according to the operation steps shown in FIG. 2.

[Step S0] Here, color transformation part 21 acquires the image signal from the image processing part 15, and performs a color coordinate transformation as necessary, thus transforming the image signal into color components such as YCbCr.

[Step S1] Here, wavelet transformation part 22 performs a recursive wavelet transformation on the image signal following color coordinate transformation, thus producing transformation coefficients.

[Step S2] Here, quantizing part 23 quantizes the transformation coefficients as necessary.

[Step S3] Here, electronic camera 11 determines the following target values in accordance with the image quality selection (e.g., fine, basic) of the recording mode, and sends these values to the ROI adjustment part 29. Where, γ total is the bit allocation rate of the image as a whole, and γ roi is the bit allocation rate of the selected region.

In addition, γ total may be a value obtained by dividing the target file size following compression by the total area (e.g., total number of pixels) of the image. Moreover, γ roi may be a value that is statistically inferred from good image compression results obtained in the past.

[Step S4] Here, electronic camera 11 determines γ notroi_min in accordance with the image quality selection of the recording mode, and sends this value to the ROI adjustment part 29. The term γ notroi_min is the minimum guaranteed bit allocation rate in the non-selected region.

[Step S5] Here, ROI adjustment part 29 acquires the position and extent of the selected region via user input of the ROI designating switch 28. ROI adjustment part 29 calculates the area ratio Aroi_user of the selected region on the basis of this user input.

[Step S6] Here, ROI adjustment part 29 predicts the bit allocation rate γ notroi of the non-selected region on the basis of the following general approximate formula:

$$\gamma\ notroi=(\gamma\ total-\gamma\ roi{\times}Aroi\_user)/(1-Aroi\_user) \quad \text{Equation 2}$$

[Step S7] Here, ROI adjustment part 29 ascertains whether or not the predicted value γ notroi is less than the guaranteed value γ notroi_min.

If it is determined from the results of this ascertainment that the guaranteed value γ notroi_in can be sufficiently guaranteed by the area ratio Aroi_user (the NO side shown in FIG. 2), ROI adjustment part 29 shifts the operation to step S10.

On the other hand, if it is determined from the results of this ascertainment that the guaranteed value γ notroi_min cannot be guaranteed by the area ratio Aroi_user (the YES side shown in FIG. 2), ROI adjustment part 29 shifts the operation to step S8.

[Step S8] Here, ROI adjustment part 29 sets the guaranteed value γ notroi_min as the bit allocation rate γ notroi of the non-selected region, and takes this as a target value.

[Step S9] Here, ROI adjustment part 29 substitutes the target value into the following general approximate formula, and determines the area ratio Aroi:

$$Aroi=(\gamma\ total-\gamma\ notroi)/(\gamma\ roi-\gamma\ notroi) \quad \text{Equation 3}$$

It should be noted that Equation 3 is obtained by modifying Equation 1 (discussed above).

After the area ratio Aroi has been determined, ROI adjustment part 29 shifts the operation to step S11.

[Step S10] Here, ROI adjustment part 29 sets the area ratio Aroi_user "as is" as the area ratio Aroi. The operation here corresponds to an operation in which the area ratio Aroi is limited with the area ratio Aroi_user as the upper limit. Thus, it is desirable that the user make a user input of the maximum selected region so that the entire object of interest is included.

[Step S11] Here, ROI adjustment part 29 acquires the selected position of the focus detection area from focus control part 12a. ROI adjustment part 29 detects the region of focus on the basis of this acquired information, and displaces the selected region in the direction of this region of focus, as shown in FIG. 3.

[Step S12] Here, ROI adjustment part 29 produces a mask image on the basis of the position and area ratio Aroi of the selected region determined thus far. ROI adjustment part 29 sets this mask image in the ROI setting part 27.

Moreover, bit plane construction part 24 divides the transformation coefficients into regions while referring to the mask image of the ROI setting part 27, and performs bit plane encoding while allocating a greater quantity of information to the selected region. Arithmetical encoding part 25 performs arithmetical encoding on the data following bit plane encoding.

[Step S13] Here, formatting part 26 arranges the arithmetically encoded data according to SNR progressive, and thus produces a bit stream. Additionally formatting part 26 cuts the bit stream using the target file size.

Therefore, image encoding according to JPEG2000 is completed as a result of the series of operations discussed above.

Effects. etc., of the First Working Configuration

In the first working configuration, as described above, the area ratio Aroi of the selected region is adjusted on the basis of:

(1) the bit allocation rate γ total of the image as a whole,
(2) the bit allocation rate γ roi of the selected region,
(3) the bit allocation rate γ notroi of the non-selected region, and
(4) the area ratio Aroi_user designated by the user.

As a result, the area of the selected region is appropriately adjusted, so that a compressed image file in which the image quality balance between the selected region and the non-selected region is favorably maintained can be produced.

Moreover, in the first working configuration, the position of the selected region is determined on basis of the position of the region of focus. As a result, ROI encoding can be performed so that the important region on the image known as the region of focus is included, thus making it possible to produce an even more favorable compressed image file.

Next, a second working configuration will be described.

Description of Operation of Second Working Configuration

The second working configuration is another working configuration of an electronic camera according to the present invention.

The construction of the electronic camera of the second working configuration is similar to that of the first working configuration (e.g., FIG. 1). Accordingly, FIG. 1 will be referred to "as is" here, and a description of the construction will be omitted.

Figure 4:
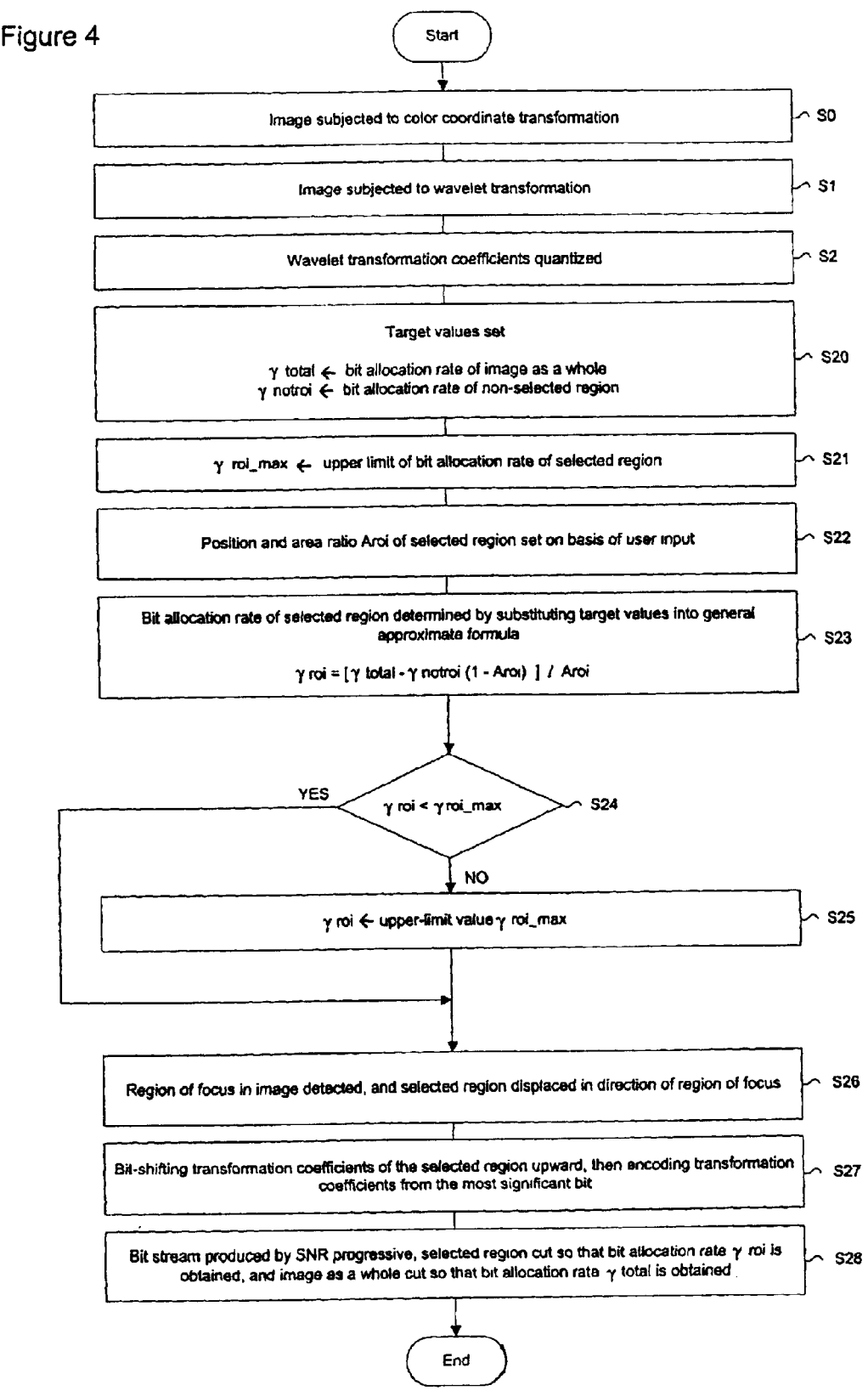
FIG. 4 is a flow chart which illustrates the operation of an image encoding device according to the present invention, in a second working configuration.

FIG. 4 is a flow chart which illustrates the operation of the image encoding device according to the present invention, in the second working configuration. Below, the operation of the image encoding device will be described according to the operating steps shown in FIG. 4.

[Steps S0 to S2] These steps are the same as in the first working configuration.

[Step S20] Here, electronic camera 11 determines the following target values in accordance with the image quality selection (e.g., fine, basic) of the recording mode, and sends the results to ROI adjustment part 29. Where, γ total is the bit allocation rate of the image as a whole, and γ notroi is the bit allocation rate of the non-selected region.

Furthermore, γ total may be a value obtained by dividing the target file size following compression by the total area (e.g., total number of pixels) of the image. Moreover, γ notroi may be a value that is statistically inferred from favorable image compression results obtained in the past.

[Step S21] Here, electronic camera 11 determines γ roi_max in accordance with the image quality selection of the recording mode, and sends the result to ROI adjustment part 29. Where, γ roi_max is the upper-limit value of the bit allocation rate of the selected region.

Moreover, γ roi$_{max}$ may also be a value that is statistically inferred from favorable image compression results obtained in the past.

[Step S22] Here, ROI adjustment part 29 acquires the position and extent of the selected region via user input of ROI designating switch 28. ROI adjustment part 29 calculates the area ratio Aroi of the selected region on the basis of the extent of this selected region, and sets this value as a target value.

[Step S23] Here, ROI adjustment part 29 calculates the bit allocation rate γ roi of the selected region by substituting the target values into the following general approximate formula:

$$\gamma\ roi = [\gamma\ total - \gamma\ notroi \times (1 - Aroi)]/Aroi \qquad \text{Equation 4}$$

It should be noted that Equation 4 is obtained by modifying Equation 1 (discussed above).

[Step S24] Here, ROI adjustment part 29 determines whether or not the bit allocation rate γ roi is less than the upper-limit value γ roi_Max. In cases where the bit allocation rate γ roi exceeds the upper-limit value γ roi_max, ROI adjustment part 29 determines that bit allocation rate γ roi is excessive and that this bit allocation rate will destroy the image quality balance between the selected region and non-selected region. Thus, ROI adjustment part 29 shifts the operation to step S25.

On the other hand, in cases where the bit allocation rate γ roi is less than the upper-limit value γ roi_Max, ROI adjustment part 29 determines that bit allocation rate γ roi is suitable, and shifts the operation to step S26.

[Step S25] Here, ROI adjustment part 29 limits the bit allocation rate γ roi to the upper-limit value γ roi_max.

[Step S26] Here, ROI adjustment part 29 acquires the selected position of the focus detection area from focus control part 12a. ROI adjustment part 29 detects the region of focus on the basis of this acquired information, and displaces the selected region in the direction of this region of focus, as shown in FIG. 3.

[Step S27] Here, ROI adjustment part 29 produces a mask image on the basis of the position and area ratio Aroi of the selected region determined thus far. ROI adjustment part 29 sets this mask image in the ROI setting part 27.

Moreover, bit plane construction part 24 divides the transformation coefficients into regions while referring to the mask image of ROI setting part 27, and performs bit plane encoding while allocating a greater quantity of information to the selected region by bit-shifting transformation coefficients of the selected region upward. Arithmetical encoding part 25 performs arithmetical encoding of the data following bit plane encoding.

[Step S28] Here, formatting part 26 produces a bit stream by arranging the arithmetically encoded data according to SNR progressive.

Additionally, the formatting part 26 cuts the bit stream of the selected region at the stage where the bit stream of the selected region exceeds the code quantity Qroi of the following equation:

$$Qroi = \gamma\ roi \times Aroi \times \text{(total number of pixels of the image as a whole)} \qquad \text{Equation 5}$$

Furthermore, formatting part 26 cuts the overall bit stream at the stage where this bit stream exceeds the target file size.

Therefore, image encoding according to JPEG2000 is completed as a result of the above-mentioned series of operations.

Effects. etc., of the Second Working Configuration

In the second working configuration, as described above, the bit allocation rate γ roi of the selected region is adjusted on the basis of:

(1) the bit allocation rate γ total of the image as a whole,
(2) the area ratio Aroi of the selected region according to the designation of the user, and
(3) the bit allocation rate γ notroi of the non-selected region.

As a result, the bit allocation rate of the selected region can be appropriately adjusted and manipulated, so that a compressed image file can be produced in which the image quality balance between the selected region and the non-selected region is favorably maintained.

Furthermore, in the second working configuration, the position of the selected region is determined on basis of the position of the region of focus. As a result, ROI encoding can be performed so that the important region on the image known as the region of focus is included, thus making it possible to produce an even more favorable compressed image file.

Next, a third working configuration will be described.
Description of Operation of Third Working Configuration The third working configuration is yet another working configuration of an electronic camera according to the present invention.

Moreover, the construction of the third working configuration is similar to that of the first working configuration (e.g., FIG. 1). Accordingly, FIG. 1 will be referred to "as is," and a description of the construction will be omitted.

FIG. 5 is a flow chart which illustrates the operation of the image encoding device according to the present invention, in the third working configuration. Below, this operation will be described according to the operation steps shown in FIG. 5.

[Step S0 to S2] These steps are the same as in the first working configuration.

[Step S30] Here, electronic camera 11 determines the following target values in accordance with the image quality selection (e.g., fine, basic) of the recording mode, and sends the results to ROI adjustment part 29. The term γ total is the bit allocation rate of the image as a whole, and K is the ratio of bit allocation rates of both regions (corresponds to γ roi/γ notroi).

Furthermore, γ total may be a value obtained by dividing the target file size following compression by the total area (e.g., total number of pixels) of the image. Moreover, K may be a value that is statistically inferred from favorable image compression results obtained in the past.

[Step S31] Here, ROI adjustment part 29 acquires the position and extent of the selected region via user input of ROI designating switch 28. ROI adjustment part 29 calculates the area ratio Aroi of the selected region on the basis of the extent of this selected region, and sets this value as a target value.

[Step S32] Here, ROI adjustment part 29 calculates the bit allocation rate γ roi of the selected region by substituting the target values into the following general approximate formula:

$$\gamma\ roi = \gamma\ total \times K/[1 + (K-1)Aroi] \qquad \text{Equation 6}$$

It should be noted that Equation 6 is obtained by modifying Equation 1 (discussed above).

[Step S33] Here, ROI adjustment part 29 limits the bit allocation rate γ roi using an upper-limit value and a lower-limit value. The upper-limit value and lower-limit value may be statistically inferred from favorable image compression results obtained in the past.

[Step S34] Here, ROI adjustment part 29 acquires the selected position of the focus detection area from focus control part 12a. ROI adjustment part 29 detects the region of focus on the basis of this acquired information, and displaces the selected region in the direction of this region of focus, as shown in FIG. 3.

[Step S35] Here, ROI adjustment part 29 produces a mask image on the basis of the position and area ratio Aroi of the selected region determined thus far. ROI adjustment part 29 sets this mask image in the ROI setting part 27.

Moreover, bit plane construction part 24 divides the transformation coefficients into regions while referring to the mask image of ROI setting part 27, and performs bit plane encoding while allocating a greater quantity of information to the selected region by bit-shifting transformation coefficients of the selected region upward. Arithmetical encoding part 25 performs arithmetical encoding of the data following bit plane encoding.

[Step S36] Here, formatting part 26 produces a bit stream by arranging the arithmetically encoded data according to SNR progressive.

Additionally formatting part 26 cuts the bit stream of the selected region at the stage where the bit stream of the selected region exceeds the code quantity Qroi of the following equation:

$$Qroi = \gamma\ roi \times Aroi \times$$
(total number of pixels of the image as a whole) Equation 7

Furthermore, formatting part 26 cuts the overall bit stream at the stage where this bit stream exceeds the target file size.

Therefore, image encoding according to JPEG2000 is completed as a result of the above-mentioned series of operations.

Effects. etc. of the Third Working Configuration

In the third working configuration, as described above, the bit allocation rate $\gamma$ roi of the selected region is adjusted on the basis of:

(1) the bit allocation rate $\gamma$ total of the image as a whole, (2) the area ratio Aroi of the selected region according to the designation of the user, and (3) the ratio K of the bit allocation rates of both regions.

As a result, the bit allocation rate of the selected region can be appropriately adjusted and manipulated, so that a compressed image file in which the image quality balance between the selected region and the non-selected region is favorably maintained, can be produced.

In particular, in the third working configuration, the "ratio K of the bit allocation rates of both regions" is used as a target value. This ratio K is a value that directly expresses the image quality balance of both regions. Accordingly, the image quality balance of the two regions can be directly controlled by using this ratio K as a target value.

Furthermore, in the third working configuration, the position of the selected region is determined on the basis of the position of the region of focus. As a result, ROI encoding can be performed so that the important region on the image known as the region of focus is included, thus making it possible to produce an even more favorable compressed image file.

Next, a fourth working configuration will be described.

Description of Operation of Fourth Working Configuration

The fourth working configuration is yet another working configuration of an electronic camera according to the present invention.

Moreover, the construction of the fourth working configuration is similar to the construction of the first working configuration (e.g., FIG. 1). Accordingly, FIG. 1 will be referred to "as is" here, and a description of the construction will be omitted.

As shown in FIGS. 6A–6F, the characterizing feature of the operation of the fourth working configuration is that the bit allocation rate of the selected region is varied in multiple stages. The remaining operation is the same as that in the first through third working configurations, discussed above. Accordingly, a description of this remaining operation is omitted here.

Thus, the characterizing feature of such an operation will be described in detail below.

Multi-Stage Variation of the Bit Allocation rate

In the fourth working configuration, as is shown in FIGS. 6A–6F, a region of greatest importance is disposed within the selected region. This region of greatest importance is a region to which a greater quantity of data is allocated with a special preference even within the selected region. On the other hand, in the periphery of the selected region, the quantity of information is allocated more moderately even within the selected region, so that the difference between this periphery of the selected region and the non-selected region is not conspicuous.

As a result, the bit allocation rate varies in multiple stages from the peripheral part of the selected region toward the region of greatest importance.

Means Used to Realize Multi-Stage Variation

Such a multi-stage variation in the bit allocation rate is realized by the operation discussed below.

First, ROI adjustment part 29 adjusts the selected region. On the basis of the results of this adjustment operation, ROI adjustment part 29 produces a multi-value mask image which indicates a multi-stage bit allocation rate in pixel units, and sets this mask image in ROI setting part 27.

Next, the multi-stage variation of the bit allocation rate is specifically executed by at least one of the component described below.

Quantizing part 23 determines multiple stages of quantizing steps while referring to the mask image, and quantizes the transformation coefficients in multiple stages.

Bit plane construction part 24 determines multiple stages of bit shift numbers while referring to the mask image, and shifts the transformation coefficients upward in multiple stages.

Formatting part 26 cuts the bit stream in multiple stages in accordance with the reference value (bit allocation rate) of the mask image.

Additionally, the formatting part 26 includes the above-mentioned multi-value mask image in the compressed image file. As a result, this mask image can also be used in decoding the compressed image file.

Rough Adjustment of the Selected Region

If such a multi-stage bit allocation rate is expressed in the form of a bit allocation rate W(x, y) at a position (x, y), then the average bit allocation rate $\gamma$ roi_ave for the selected region is as follows:

$$\gamma\ roi\_ave = \sum_{x,y \in ROI} W(x, y) / Nroi \qquad \text{Equation 8}$$

(Here, Nroi is the number of pixels of the selected region.)

Accordingly, a rough adjustment of the selected region can be accomplished in the same manner as in the first through third working configurations, discussed above, by using this average bit allocation rate $\gamma$ roi_ave instead of the bit allocation rate $\gamma$ roi used in the first through third working configurations.

Fine Variations of the Adjustment Operation of the Selected Region

By utilizing the degree of freedom of the bit allocation rate, ROI adjustment part 29 can apply the fine variations to the adjustment of the selected region, as discussed below.

[A] As shown in FIG. 6A, in area adjustment of the selected region, ROI adjustment part 29 adjusts the areas of the selected region and region of greatest importance at a fixed ratio. In this case, the slope of increase of the bit allocation rate is also adjusted. Such an area adjustment is suitable for use in cases where the quantity of information allocated to the selected region is greatly adjusted.

[B] As shown in FIG. 6B, in area adjustment of the selected region, ROI adjustment part 29 keeps the area of the region of greatest importance constant, and adjusts the area of the selected region. In this case, the slope of increase of the bit allocation rate is also adjusted. Such an area adjustment is suitable for use in cases where the region of greatest importance cannot be altered, such as cases in which the region of greatest importance is set in accordance with the size of the object of imaging.

[C] As shown in FIG. 6C, in area adjustment of the selected region, ROI adjustment part 29 keeps the area of the selected region constant, and adjusts the area of the region of greatest importance. In this case, the slope of increase of the bit allocation rate is also adjusted. Such an area adjustment is suitable for use in cases where the selected region cannot be altered, such as cases in which the selected region is set in accordance with the size of the object of imaging.

[D] As shown in FIG. 6D, in area adjustment of the selected region, ROI adjustment part 29 adjusts the areas of both the selected region and the region of greatest importance while keeping the slope of the bit allocation rate at a constant value. In this case, since the slope of the bit allocation rate is maintained at a constant value, this adjustment operation is suitable for use in cases where it is desired to prevent the boundary between the selected region and the non-selected region from becoming noticeable.

[E] As shown in FIG. 6E, in adjustment of the bit allocation rate, ROI adjustment part 29 adjusts the maximum bit allocation rate of the region of greatest importance while maintaining the slope of the bit allocation rate at a constant value. In this case, the area of the selected region is adjusted as a result. Furthermore, since the slope of the bit allocation rate is maintained at a constant value in this case, this adjustment operation is suitable for use in cases where it is desired to prevent the boundary between the selected region and the non-selected region from becoming noticeable.

[F] As shown in FIG. 6F, in adjustment of the bit allocation rate, ROI adjustment part 29 adjusts the maximum bit allocation rate of the region of greatest importance while maintaining the area of the selected region at a constant value. In this case, the slope of the bit allocation rate is also adjusted. Such an adjustment of the bit allocation rate is an adjustment operation suitable for use in cases where the selected region cannot be altered, such as cases in which the selected region is set in accordance with the size of the object of imaging.

It should be noted that more specific and diverse variations can be applied to the adjustment operation of the selected region by performing the above-mentioned area adjustments A through D (FIGS. 6A–6D) in combination with the bit allocation rate adjustments E and F (FIGS. 6E–6F).

Items Supplementary to the Working Configurations

In the above-mentioned first through fourth working configurations, the image is transformed into transformation coefficients by performing a wavelet transformation. However, the present invention is not limited to such a transformation. In general, it is sufficient if the image is transformed into transformation coefficients using frequency decomposition.

For example, orthogonal transformations such as a discrete cosine transformation, discrete Fourier transformation, Hadamard transformation or Karhunen-Loeve transformation can be used. In the case of such orthogonal transformations, it is desirable that the image be divided into the selected region and non-selected region using the minimum processing blocks of the orthogonal transformation as units.

Furthermore, the image may also be transformed into transformation coefficients by sub-band decomposition. Besides wavelet transformation, such sub-band decomposition also includes pyramid-hierarchical encoding.

Additionally, in the above-mentioned first through fourth working configurations, the bit allocation rate of the selected region is controlled by cutting the bit stream. However, the present invention is not limited to this. For example, it would also be possible to control the bit allocation rate of the selected region by using the quantizing part 23 to adjust the quantizing steps of the selected region. Alternatively, it would also be possible to control the bit allocation rate of the selected region by using bit plane construction part 24 to adjust the bit shift number of the selected region.

Moreover, in the above-mentioned working configurations, it would also be possible to adjust area ratio Aroi of the selected region using:
(1) the bit allocation rate γ total of the image as a whole,
(2) the bit allocation rate γ roi of the selected region, and
(3) the ratio K of the bit allocation rates of both regions,
as target values, as discussed above.

Furthermore, area ratio Aroi of the selected region may also be determined by substituting these target values into the following equation, as discussed above.

$$Aroi=(K \times \gamma \text{ total}/\gamma \text{ roi} \times 1)/(K \times 1) \qquad \text{Equation 9}$$

It should be noted that Equation 9 is obtained by modifying Equation 1 (discussed above).

Additionally, in the above-mentioned working configurations, it would also be possible to limit area ratio Aroi in accordance with at least an upper-limit value or a lower-limit value (or both). Such an upper-limit value and lower-limit value may be values that are statistically inferred from favorable image compression results that have been obtained in the past. As a result of such limits, the danger that the area ratio Aroi will be set as a biased value is eliminated, so that the area of the ROI region can be adjusted much more appropriately.

Moreover, in the above-mentioned working configurations, bit allocation rate γ roi may also be limited in accordance with at least an upper-limit value or a lower-limit value (or both). Such an upper-limit value and lower-limit value may be values that are statistically inferred from favorable image compression results that have been obtained in the past. As a result of such limits, the danger that the bit allocation rate γ roi will be set as a biased value is eliminated, so that the bit allocation rate γ roi can be adjusted much more appropriately.

Furthermore, in the above-mentioned working configurations, the region of focus is detected on basis of the selection of the focus detection area. However, the present invention is not limited to this. For example, it would also be possible to detect the region of focus on the image by contrast detection or space frequency analysis of the image.

Additionally, in the above-mentioned working configurations, the selected region is displaced in the direction of the region of focus. This is advantageous in that the position of the selected region can be flexibly determined while taking into account both the designation of the user and the region of focus. However, the present invention is not limited to this. For example, it would also be possible to set the position of the selected region with the region of focus at the center. Furthermore, the position and extent of the selected region may be adjusted so that the region of focus is included to the maximum extent possible.

Moreover, in the above-mentioned working configurations, although designation of the selected region by the user is viewed with importance, the selected region is appropriately varied in accordance with the target values. This is advantageous in that the selected region can be skillfully adjusted while taking into account both the designation of the user and the target values. However, the present invention is not limited to this. For example, it would also be possible to install an operating mode in which the selected region is set "as is" in accordance with the designation of the user. Furthermore, an operating mode in which the selected region is set on basis of image information may also be installed.

Furthermore, in the above-mentioned first through fourth working configurations, a space frequency low-pass treatment may be applied to the non-selected region, as discussed above. For example, ROI adjustment part 29 determines the selected region prior to frequency decomposition of the image (steps S0 to S2). Next, ROI adjustment part 29 discriminates the non-selected region from the image prior to frequency decomposition, and performs a space frequency low-pass treatment such as Gauss gradation on this non-selected region. In regard to the low-pass characteristics in this case, it is desirable that high-band signal components that are lost in high-efficiency encoding be suppressed beforehand. As a result of such a treatment, the deterioration in image quality that occurs in high-efficiency encoding is reduced, thus making the noise of the decoded image unnoticeable.

Additionally, in the above-mentioned working configurations, an electronic camera 11 on which an image encoding device 20 is mounted was described. However, the present invention is not limited to an electronic camera. More broadly, present invention is a technique that can be used in image encoding in general.

For example, an image encoding program for executing the operations of the above-mentioned working configurations in a computer can be prepared. The recording medium discussed above can be obtained by recording this image encoding program on a recording medium.

Moreover, operation of the present invention in regard to the above-mentioned program and program recording medium is not limited by the above-mentioned working configurations. For example, such a program may be distributed via communications circuits, and the program may be recorded for example, in a system memory or a hard disk of the destination computer. By such program distribution, the program distribution source can manufacture the program or program recording medium in destination locations. Moreover, by such program distribution, the distribution source can transfer the program or program recording medium to the destinations. Furthermore, the fact that the program can be distributed may be published via a communications circuit, and a service which provides information on the program storage location may be performed.

Effect of the Invention

In the image encoding device according to the present invention, the area of the selected region is adjusted when the selected region is designated. In fixed-length compression, such an area adjustment makes it possible to control the quantity of information that is distributed to the non-selected region. As a result, the image quality balance between the selected region and the non-selected region can be controlled to a desired state.

Furthermore, in the image encoding device according to the present invention, the area of the selected region is adjusted on basis of the "bit allocation rate of the image as a whole," "bit allocation rate of the selected region" and "bit allocation rate of the non-selected region," which are pre-determined as target values. Accordingly, the area of the selected region can be quickly determined without any illogical adjustment of the area of the selected region.

Additionally, in the image encoding device according to the present invention, the area of the selected region is adjusted on basis of the "bit allocation rate of the image as a whole," "bit allocation rate of the selected region" and "ratio of the bit allocation rates of both regions," which are given beforehand as target values. Accordingly, the area of the selected region can be quickly determined without any illogical adjustment of the area of the selected region.

Moreover, in the image encoding device according to the present invention, the area of the selected region can easily be determined by substituting the target values into Equation 1.

Furthermore, in the image encoding device according to the present invention, an adjustment operation is performed with an upper limit and lower limit applied to the area of the selected region. Accordingly, there is no danger that the selected region will be adjusted to an illogical area.

For example, a case may be envisioned in which the quantity of image information contained in the non-selected region is small to begin with, so that the bit allocation rate of the non-selected region cannot be effectively raised regardless of how far the area of the selected region is narrowed. In such a case, unnecessary narrowing of the area of the selected region can be avoided by applying a lower limit to the area of the selected region.

Additionally, a case may also be envisioned in which the quantity of image information in the image as a whole is small to begin with, so that the bit allocation rate of the non-selected region cannot be effectively lowered regardless of how far the area of the selected region is expanded. In such a case, unnecessary expansion of the area of the selected region can be avoided by applying an upper limit to the area of the selected region.

Moreover, in the image encoding device according to the present invention, the bit allocation rate of the selected region is adjusted when the selected region is designated. In fixed-length compression, the bit allocation rate of the non-selected region can be controlled by such an adjustment. As a result, the image quality balance between the selected region and the non-selected region can be controlled to a desired state.

Furthermore, in the image encoding device according to the present invention, the bit allocation rate of the selected region is adjusted on basis of the "bit allocation rate of the image as a whole," "area of the selected region" and "bit allocation rate of the non-selected region," which are pre-determined as target values. Accordingly, the bit allocation rate of the selected region can be quickly determined without any illogical adjustment of the bit allocation rate of the selected region.

Additionally, in the image encoding device according to the present invention, the bit allocation rate of the selected region is adjusted on basis of the "bit allocation rate of the image as a whole," "area of the selected region" and "ratio of the bit allocation rates of both regions," which are pre-determined as target values. Accordingly, the bit allocation rate of the selected region can be quickly determined without any illogical adjustment of the bit allocation rate of the selected region.

Moreover, in the image encoding device according to the present invention, the bit allocation rate of the selected region can easily be determined by substituting the target values into Equation 1.

Furthermore, in the image encoding device according to the present invention, an adjustment operation is performed with an upper limit and lower limit applied to the bit allocation rate of the selected region. Accordingly, there is no danger that the selected region will be adjusted to an illogical bit allocation rate.

For example, a case may be envisioned in which the amount of image information contained in the non-selected region is small to begin with, so that the bit allocation rate of the non-selected region cannot be effectively raised regardless of how far the bit allocation rate of the selected region is lowered. In such a case, unnecessary lowering of the bit allocation rate of the selected region can be avoided by applying a lower limit to the bit allocation rate of the selected region.

Additionally, a case may also be envisioned in which the amount of image information contained in the selected region is small to begin with, so that the bit allocation rate of the selected region does not actually rise regardless of how high the bit allocation rate of the selected region is set. In such a case, setting the bit allocation rate of the selected region at an unnecessarily high value can be avoided by applying an upper limit to the bit allocation rate of the selected region.

Moreover, in the image encoding device according to the present invention, the slope of increase of the quantity of information allocated to the selected region is adjusted when the selected region is designated. In fixed-length compression, the quantity of information distributed to the non-selected region can be controlled by means of such an adjustment. As a result, the image quality balance between the selected region and the non-selected region can be controlled to a desired state.

Furthermore, in the image encoding device according to the present invention, the maximum value of the bit allocation rate allocated to the selected region is adjusted when the selected region is designated. In fixed-length compression, the quantity of information distributed to the non-selected region can be controlled by means of such an adjustment. As a result, image quality balance between the selected region and the non-selected region can be controlled to a desired state.

Additionally, in the image encoding device according to the present invention, the selected region is determined on basis of the region of focus of the image. Accordingly, the selected region, known as the region of focus, can be appropriately designated in accordance with the major interest of the user.

Moreover, in the image encoding device according to the present invention, the selected region is displaced in direction of the region of focus of the image when the selected region is designated. As a result, the selected region, known as the region of focus, can be skillfully adjusted so that this region approaches the major interest of the user.

Furthermore, in the image encoding device according to the present invention, the selected region is designated according to the designating input of the user. Accordingly, the user can freely set the selected region in accordance with the desired position, size or shape.

Additionally, in the image encoding device according to the present invention, a space frequency low-pass treatment is performed on the non-selected region. For example, in cases where a space frequency low-pass treatment is performed on the non-selected region prior to encoding, the high-band signal components that are lost as a result of high-efficiency encoding of the non-selected region are reduced in advance, so that deterioration in the image quality of the non-selected region can be prevented from becoming noticeable.

Next, an electronic camera can be constructed equipped with the image encoding device according to the present invention.

Finally, the image encoding device according to the present invention can be realized in a computer.

Although the foregoing description is directed to the preferred embodiments of the invention, it is noted that other variations and modifications will be apparent to those skilled in the art, and may be made without departing from the spirit or scope of the invention.

What is claimed is:

1. An image encoding device, comprising:
 a transformation component for converting an image into transformation coefficients by subjecting said image to a frequency decomposition, said image having an area;
 a dividing component for dividing said transformation coefficients produced by said transformation component into a selected region and a non-selected region on said image, said non-selected region being an area of said image other than an area defined by said selected region;
 an encoding component for encoding said transformation coefficients by allocating a greater quantity of information to said selected region than to said non-selected region; and
 a region adjustment component for controlling a bit allocation rate of said non-selected region by adjusting the area of said selected region, the bit allocation rate being a mean amount of code per unit area.

2. The image encoding device according to claim 1, wherein
 said region adjustment component adjusts the area of said selected region by taking into account:
 a bit allocation rate of said image as a whole;
 a bit allocation rate of said selected region; and
 the bit allocation rate of said non-selected region, and
 wherein, each of the bit allocation rates is determined in advance as a target value.

3. The image encoding device according to claim 1, wherein
 said region adjustment component adjusts the area of said selected region by taking into account:
 a bit allocation rate of said image as a whole;
 a bit allocation rate of said selected region; and
 a ratio of the bit allocation rate of said selected region to the bit allocation rate of said non-selected region, and
 wherein, each of the bit allocation rates and the ratio are determined in advance as target values.

4. The image encoding device according to claim 2, wherein
 said region adjustment component determines an adjustment value of the area of said selected region by substituting said target values into the following general calculation equation:

$$\gamma\ total = \gamma\ roi \times Aroi + \gamma\ notroi \times (1 - Aroi),$$

where, $\gamma$ total is the bit allocation rate of said image as a whole, $\gamma$ roi is the bit allocation rate of said selected region, Aroi is a proportion of the area of said image as a whole that is occupied by said selected region, and γ notroi is the bit allocation rate of said non-selected region, and solving said equation.

5. The image encoding device according to claim 4, wherein
said region adjustment component limits the adjustment value of the area of said selected region by at least a pre-determined upper-limit value or a pre-determined lower-limit value.

6. An image encoding device, comprising:
a transformation component for converting an image into transformation coefficients by subjecting said image to a frequency decomposition, said image having an area;
a dividing component for dividing said transformation coefficients produced by said transformation component into a selected region and a non-selected region on said image, said non-selected region being an area of said image other than an area defined by said selected region;
an encoding component for encoding said transformation coefficients by allocating a greater quantity of information to said selected region than to said non-selected region; and
a region adjustment component for controlling a bit allocation rate of said non-selected region by adjusting a bit allocation rate of said selected region.

7. The image encoding device according to claim 6, wherein
said region adjustment component adjusts the bit allocation rate of said selected region by taking into account:
a bit allocation rate of said image as a whole;
the area of said selected region; and
the bit allocation rate of said non-selected region, and
wherein, each of the bit allocation rates and the area are determined in advance as target values.

8. The image encoding device according to claim 6, wherein
said region adjustment component adjusts the bit allocation rate of said selected region by taking into account:
a bit allocation rate of said image as a whole;
the area of said selected region; and
a ratio of the bit allocation rate of said selected region to the bit allocation rate of said non-selected region, and
wherein, the bit allocation rate of said image as a whole, the area of said selected region and the ratio are determined in advance as target values.

9. The image encoding device according to claim 7, wherein
said region adjustment component determines an adjustment value of the bit allocation rate of said selected region by substituting said target values into the following general calculation equation:

$$\gamma\ total = \gamma\ roi \times Aroi + \gamma\ notroi \times (1 - Aroi),$$

where, γ total is the bit allocation rate of said image as a whole, γ roi is the bit allocation rate of said selected region, Aroi is a proportion of the area of said image as a whole that is occupied by said selected region, and γ notroi is the bit allocation rate of said non-selected region, and solving said equation.

10. The image encoding device according to claim 9, wherein
said region adjustment component limits the adjustment value of the bit allocation rate of said selected region by at least a pre-determined upper-limit value or a pre-determined lower-limit value.

11. An image encoding device, comprising:
a transformation component for converting an image into transformation coefficients by subjecting said image to a frequency decomposition;
a dividing component for dividing said transformation coefficients produced by said transformation component into a selected region and a non-selected region on said image, said non-selected region being an area of said image other than an area defined by said selected region;
an encoding component for encoding said transformation coefficients by allocating a greater quantity of information to said selected region than to said non-selected region, wherein said encoding component encodes said transformation coefficients while gradually increasing allocation of a quantity of information from a peripheral part of said selected region toward a central part of said selected region; and
a region adjustment component for controlling a bit allocation rate of said non-selected region by adjusting a slope of increase of said allocation.

12. An image encoding device, comprising:
a transformation component for converting an image into transformation coefficients by subjecting said image to a frequency decomposition;
a dividing component for dividing said transformation coefficients produced by said transformation component into a selected region and a non-selected region on said image, said non-selected region being an area of said image other than an area defined by said selected region;
an encoding component for encoding said transformation coefficients by allocating a greater quantity of information to said selected region than to said non-selected region, wherein said encoding component encodes said transformation coefficients while gradually increasing allocation of a quantity of information from a peripheral part of said selected region toward a central part of said selected region; and
a region adjustment component for controlling a bit allocation rate of said non-selected region by adjusting a maximum value of a bit allocation rate of said selected region.

13. An image encoding device, comprising:
a transformation component for converting an image into transformation coefficients by subjecting said image to a frequency decomposition;
a region adjustment component for detecting a region of focus on said image and for determining a selected region on said image on the basis of said region of focus;
a dividing component for dividing said transformation coefficients produced by said transformation component into said selected region and a non-selected region on said image, said non-selected region being an area of said image other than an area defined by said selected region; and
an encoding component for encoding said transformation coefficients by allocating a greater quantity of information to said selected region than to said non-selected region.

14. An image encoding device, comprising:
a transformation component for converting an image into transformation coefficients by subjecting said image to a frequency decomposition;

a dividing component for dividing said transformation coefficients produced by said transformation component into a selected region and a non-selected region on said image, said non-selected region being an area of said image other than an area defined by said selected region;

an encoding component for encoding said transformation coefficients by allocating a greater quantity of information to said selected region than to said non-selected region; and a region adjustment component for detecting a region of focus on said image and for displacing said selected region in direction of said region of focus.

15. An image encoding device, comprising:

a transformation component for converting an image into transformation coefficients by subjecting said image to a frequency decomposition;

a region adjustment component for receiving an input indicating a selected region on said image and for setting said selected region in accordance with said input;

a dividing component for dividing said transformation coefficients produced by said transformation component into said selected region and a non-selected region on said image, said non-selected region being an area of said image other than an area defined by said selected region; and an encoding component for encoding said transformation coefficients by allocating a greater quantity of information to said selected region than to said non-selected region.

16. An electronic camera, comprising:

an image encoding device, comprising:
- a transformation component for converting an image into transformation coefficients by subjecting said image to a frequency decomposition, said image having an area;
- a dividing component for dividing said transformation coefficients produced by said transformation component into a selected region and a non-selected region on said image, said non-selected region being an area of said image other than an area defined by said selected region;
- an encoding component for encoding said transformation coefficients by allocating a greater quantity of information to said selected region than to said non-selected region; and
- a region adjustment component for controlling a bit allocation rate of said non-selected region by adjusting the area of said selected region, the bit allocation rate being a mean amount of code per unit area, and an imaging component for imaging an object and producing image data, wherein said image encoding device encodes said image data produced by said imaging component.

17. A computer, comprising:

an image encoding program which allows the computer to function as:
- a transformation component for converting an image into transformation coefficients by subjecting said image to a frequency decomposition, said image having an area;
- a dividing component for dividing said transformation coefficients produced by said transformation component into a selected region and a non-selected region on said image, said non-selected region being an area of said image other than an area defined by said selected region;
- an encoding component for encoding said transformation coefficients by allocating a greater quantity of information to said selected region than to said non-selected region; and
- a region adjustment component for controlling a bit allocation rate of said non-selected region by adjusting the area of said selected region, the bit allocation rate being a mean amount of code per unit area, and a machine-readable recording medium for recording said image encoding program.

18. A method of encoding an image, comprising the steps of:

converting an image into transformation coefficients by subjecting said image to a frequency decomposition, said image having an area;

dividing said transformation coefficients into a selected region and a non-selected region on said image, said non-selected region being an area of said image other than an area defined by said selected region;

encoding said transformation coefficients by allocating a greater quantity of information to said selected region than to said non-selected region; and controlling a bit allocation rate of said non-selected region by adjusting the area of said selected region, the bit allocation rate being a mean amount of code per unit area.

19. The method according to claim 18, further comprising the step of:

adjusting the area of said selected region by taking into account:
- a bit allocation rate of said image as a whole;
- a bit allocation rate of said selected region; and
- the bit allocation rate of said non-selected region, wherein, each of the bit allocation rates is determined in advance as a target value.

20. The method according to claim 18, further comprising the step of:

adjusting the area of said selected region by taking into account:
- a bit allocation rate of said image as a whole;
- a bit allocation rate of said selected region; and
- a ratio of the bit allocation rate of said selected region to the bit allocation rate of said non-selected region, wherein, each of the bit allocation rates and the ratio are determined in advance as target values.

21. The method according to claim 19, further comprising the steps of:

determining an adjustment value of the area of said selected region by substituting said target values into the following general calculation equation:

$$\gamma\text{ total} = \gamma\ roi \times Aroi + \gamma\ notroi \times (1 - Aroi),$$

where, $\gamma$ total is the bit allocation rate of said image as a whole, $\gamma$ roi is the bit allocation rate of said selected region, Aroi is a proportion of the area of said image as a whole that is occupied by said selected region, and $\gamma$ notroi is the bit allocation rate of said non-selected region, and solving said equation.

22. The method according to claim 21, further comprising the step of:

limiting the adjustment value of the area of said selected region by at least a pre-determined upper-limit value or a pre-determined lower-limit value.

23. A method of encoding an image, comprising the steps of:
- converting an image into transformation coefficients by subjecting said image to a frequency decomposition, said image having an area;
- dividing said transformation coefficients into a selected region and a non-selected region on said image, said non-selected region being an area of said image other than an area defined by said selected region;
- encoding said transformation coefficients by allocating a greater quantity of information to said selected region than to said non-selected region; and
- controlling a bit allocation rate of said non-selected region by adjusting a bit allocation rate of said selected region.

24. The method according to claim 23, further comprising the step of:
- adjusting the bit allocation rate of said selected region by taking into account:
  - a bit allocation rate of said image as a whole;
  - the area of said selected region; and
  - the bit allocation rate of said non-selected region,
- wherein, each of the bit allocation rates and the area are determined in advance as target values.

25. The method according to claim 23, further comprising the step of:
- adjusting the bit allocation rate of said selected region by taking into account:
- a bit allocation rate of said image as a whole;
- the area of said selected region; and
- a ratio of the bit allocation rate of said selected region to the bit allocation rate of said non-selected region,
- wherein, the bit allocation rate of said image as a whole, the area of said selected region and the ratio are determined in advance as target values.

26. The method according to claim 24, further comprising the steps of:
- determining an adjustment value of the bit allocation rate of said selected region by substituting said target values into the following general calculation equation:

$$\gamma\ total = \gamma\ roi \times Aroi + \gamma\ notroi \times (1 - Aroi),$$

where, γ total is the bit allocation rate of said image as a whole, y roi is the bit allocation rate of said selected region, Aroi is a proportion of the area of said image as a whole that is occupied by said selected region, and γ notroi is the bit allocation rate of said non-selected region, and
- solving said equation.

27. The method according to claim 26, further comprising the step of:
- limiting the adjustment value of the bit allocation rate of said selected region by at least a pre-determined upper-limit value or a pre-determined lower-limit value.

28. A method of encoding an image, comprising the steps of:
- converting an image into transformation coefficients by subjecting said image to a frequency decomposition;
- dividing said transformation coefficients into a selected region and a non-selected region on said image, said non-selected region being an area of said image other than an area defined by said selected region;
- encoding said transformation coefficients by allocating a greater quantity of information to said selected region than to said non-selected region, wherein said transformation coefficients are encoded while allocation of a quantity of information from a peripheral part of said selected region toward a central part of said selected region is gradually increased; and
- controlling a bit allocation rate of said non-selected region by adjusting a slope of increase of said allocation.

29. A method of encoding an image, comprising the steps of:
- converting an image into transformation coefficients by subjecting said image to a frequency decomposition;
- dividing said transformation coefficients into a selected region and a non-selected region on said image, said non-selected region being an area of said image other than an area defined by said selected region;
- encoding said transformation coefficients by allocating a greater quantity of information to said selected region than to said non-selected region, wherein said transformation coefficients are encoded while allocation of a quantity of information from a peripheral part of said selected region toward a central part of said selected region is gradually increased; and
- controlling a bit allocation rate of said non-selected region by adjusting a maximum value of a bit allocation rate of said selected region.

30. A method of encoding an image, comprising the steps of:
- converting an image into transformation coefficients by subjecting said image to a frequency decomposition;
- detecting a region of focus on said image;
- determining a selected region on said image on the basis of said region of focus;
- dividing said transformation coefficients into said selected region and a non-selected region on said image, said non-selected region being an area of said image other than an area defined by said selected region; and
- encoding said transformation coefficients by allocating a greater quantity of information to said selected region than to said non-selected region.

31. A method of encoding an image, comprising the steps of:
- converting an image into transformation coefficients by subjecting said image to a frequency decomposition;
- dividing said transformation coefficients into a selected region and a non-selected region on said image, said non-selected region being an area of said image other than an area defined by said selected region;
- encoding said transformation coefficients by allocating a greater quantity of information to said selected region than to said non-selected region;
- detecting a region of focus on said image; and
- displacing said selected region in direction of said region of focus.

32. A method of encoding an image, comprising the steps of:
- converting an image into transformation coefficients by subjecting said image to a frequency decomposition;
- receiving an input indicating a selected region on said image;
- setting said selected region in accordance with said input;
- dividing said transformation coefficients into said selected region and a non-selected region on said image, said non-selected region being an area of said image other than an area defined by said selected region; and
- encoding said transformation coefficients by allocating a greater quantity of information to said selected region than to said non-selected region.

33. A method of encoding an image in an electronic camera, comprising the steps of:
  imaging an object, thus producing an image having an area;
  producing image data from said image; and
  encoding said image data by:
    converting said image data into transformation coefficients by subjecting said image data to a frequency decomposition;
    dividing said transformation coefficients into a selected region and a non-selected region of said image, said non-selected region being an area of said image other than an area defined by said selected region;
    encoding said transformation coefficients by allocating a greater quantity of information to said selected region than to said non-selected region; and
    controlling a bit allocation rate of said non-selected region by adjusting the area of said selected region, the bit allocation rate being a mean amount of code per unit area.

34. A method of encoding an image on a computer, comprising the step of:
  recording an image encoding program on the computer, thus allowing the computer to:
    convert an image into transformation coefficients by subjecting said image to a frequency decomposition, said image having an area;
    divide said transformation coefficients into a selected region and a non-selected region on said image, said non-selected region being an area of said image other than an area defined by said selected region;
    encode said transformation coefficients by allocating a greater quantity of information to said selected region than to said non-selected region; and
    control a bit allocation rate of said non-selected region by adjusting the area of said selected region, the bit allocation rate being a mean amount of code per unit area.

* * * * *